United States Patent [19]

Hinton

[11] Patent Number: 4,466,327
[45] Date of Patent: Aug. 21, 1984

[54] GAS DRIVEN MUSIC BOX

[76] Inventor: E. Louis Hinton, 851 Brighton, LaHabra, Calif. 90631

[21] Appl. No.: 428,484

[22] Filed: Sep. 29, 1982

[51] Int. Cl.³ .................................... G10F 1/06
[52] U.S. Cl. .................................... 84/95 C
[58] Field of Search ...................... 84/946, 956

[56] References Cited

U.S. PATENT DOCUMENTS 2,495,365 1/1950 Cohn .................................. 84/94 C
3,122,959 3/1964 Barr .................................. 84/94 C

FOREIGN PATENT DOCUMENTS 15746 12/1897 Switzerland .................. 84/94 C
10408 of 1891 United Kingdom ........... 84/95 C Primary Examiner—Richard A. Wintercorn
Assistant Examiner—Brian W. Brown
Attorney, Agent, or Firm—Robert G. Upton

[57] ABSTRACT

A music box mechanism driven by turbine action from the fluid flow of, for instance, steam or wind is disclosed. The mechanism may be used to produce mechanical music in a teakettle or a weather vane for instance.

7 Claims, 6 Drawing Figures

U.S. Patent  Aug. 21, 1984  Sheet 1 of 3  4,466,327
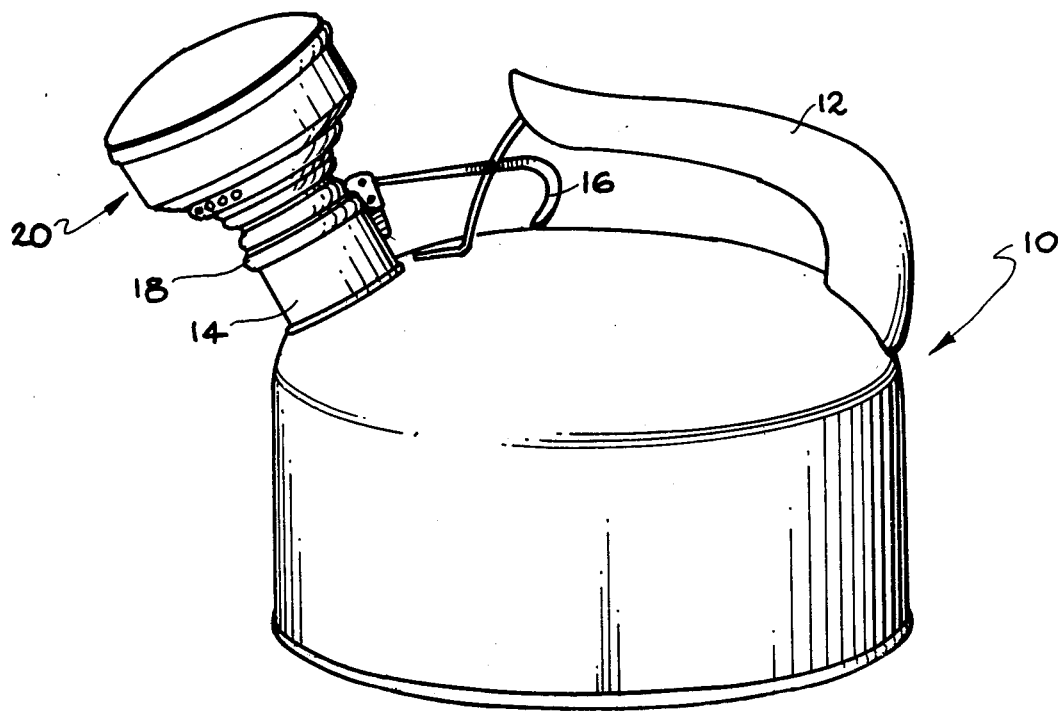
FIG. 1
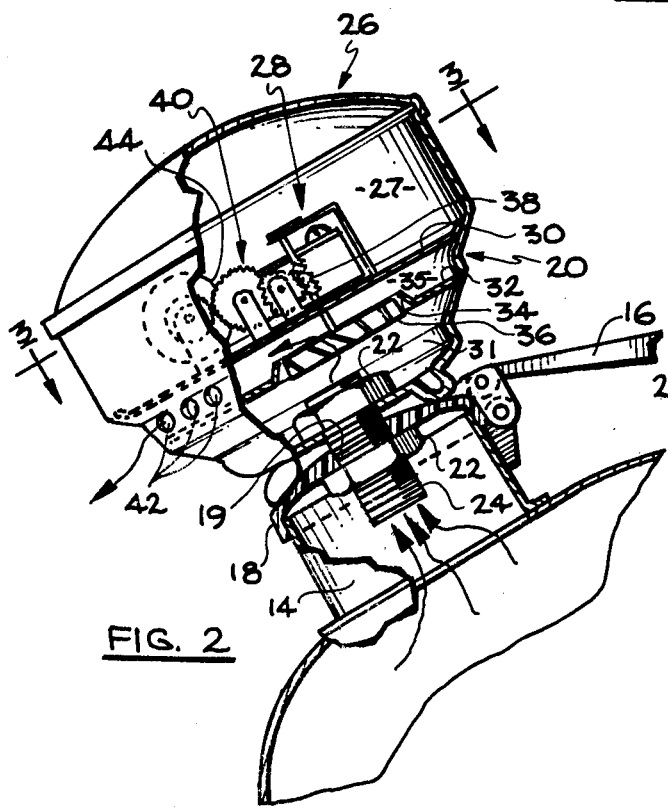
FIG. 2
FIG. 3

GAS DRIVEN MUSIC BOX

BACKGROUND OF THE INVENTION

1. Field of the Invention

This invention relates to music box mechanisms and is directed more particularly to the use of steam or wind to operate such a mechanism and to uses for a music box so powered.

Many household appliances mark the end of their operating cycle by sounding an alarm such as a bell or a buzzer. Typically, domestic teakettles blow steam through a shrill whistle as a signal that the water is hot. This irritating noise is silenced by some people at the risk of ruin to their teakettle should it boil dry through forgetfulness. In the instant invention, the steam is used to drive a music box mechanism and play a pleasant and appropriate tune, such as "Tea for Two".

2. Description of the Prior Art

Music box mechanisms are generally concealed within another commodity as an adjunct thereto: a toy, doll, decanter, rocking chair or a box for jewelry, tobacco or face powder are typical applications.

The mechanism usually interacts in some way with its host commodity, usually use of the item permits the mechanism to operate. For instance, when the jewelry box is closed, a pin interferes with and prevents the rotation of the flywheel governor of the mechanism. When the box is opened, the pin is withdrawn and the flywheel is free to spin to drive the music-making mechanism until the box is again closed.

U.S. Pat. No. 2,252,239 utilizes a pendulum member to interfere with the flywheel of a music box. Mounted in a decanter, the pendulum swings free when the container is tipped to pour.

In some uses, the interaction is more positive in that it provides motive energy to the music box mechanism rather than interfering with its operation. One such case is taught in U.S. Pat. No. 4,341,142 wherein the reciprocal action of a rocking chair is used to wind, accumulatively, a clock spring which then powers the music box. In another prior art use, a string, wound about a bobbin in the mechanism, is pulled outward to wind the clock spring accumulatively and is returned to the bobbin by a smaller secondary clock spring.

It should be noted that in the foregoing prior art the music box is always powered by energy stored in a clock spring and the energy is given a time rate of release through use of an escapement or governor. This time rate is, of course, an essential element in the production of music.

SUMMARY OF THE INVENTION

It is an object of this invention to provide a music box mechanism powered by the relative movement of a gas or vapor through a turbine wheel driving a speed-reducing gear train.

It is another object of this invention to provide a music box mechanism wherein the time rate of operation results from matching the turbine wheel to the music box plectrum cylinder via a predetermined gear train ratio.

It is yet another object of this invention to provide a music box mechanism sufficiently compact to be housed within a handle of a teakettle and sufficiently efficient to operate from the energy present in the normal exhalations or discharge of a teakettle while boiling water.

A further object of this invention is to provide a musical teakettle operable without compromise of normal convenience or safety.

The turbine wheel is ideally a full disk, axial flow fan, somewhat like an American windmill. In operation, however, the flow is not purely axial. Close direct coupling of the turbine to the gear train is desirable and the gears must be housed away from or protectively isolated from the steam. Water condensing between a worm gear and worm wheel, or between similarly sized spur gears, will stop the turbine by surface tension of the water over the area of gear contact. Thus, the steam is required to change directions near the turbine to clear a mechanism housing.

Volumetric requirements for housing the mechanism have been reduced substantially from that required by prior art mechanisms through moving the turbine wheel to outside the housing and using a compact gear drive. No drive spring or governor is used.

When the pouring agent is closed and the water is boiling, exhaust steam is directed around the outer sides of the spout, safely away from the handle. The mechanism adds negligible weight to the teakettle.

A music box mechanism to be driven by the directed fluid flow of a stream of gas or vapor to drivingly impinge a turbine wheel mounted on a turbine shaft has its components mounted on an assembly base.

A gas reservoir at relatively elevated pressure supplies a gas flow which is conveyed to form a directed stream to drivingly impinge the turbine wheel, causing the wheel and shaft to rotate.

The turbine shaft drives a speed reduction gear train and thereby a musically programmed plectrum cylinder. The gear train has a fixed speed reduction ratio selected to turn the plectrum cylinder at a surface rate from about four and one-half inches per minute to about nine and one-half inches per minute when the turbine is spinning at a natural and unregulated rate.

The plectrum cylinder is rotatably mounted on the assembly base. An array of tuned reeds are stationarily mounted in cooperative relationship to the cylinder surface.

The music box mechanism is protectively housed in a chamber through which the turbine shaft protrudes to support the turbine wheel external to the chamber. The mechanism is mounted in conjunction with a resonant member which obviously could be at least a part of the chamber.

An advantage of this invention is that it provides a mechanism which uses energy normally wasted to provide a pleasant melody to signal when the water is boiling, requiring no special attention in the process.

Another advantage of this invention is that it provides the mechanism for a musical windmill or for a musical weather vane for the garden.

The above noted objects and advantages of the present invention will be more fully understood upon a study of the following description in conjunction with the detailed drawings.

BRIEF DESCRIPTION OF THE DRAWINGS

FIG. 1 illustrates a music box attached to a steam kettle, the steam energy normally used to create the whistle is used to drive a turbine wheel to actuate the music box.

FIG. 2 is a partial sectional view of the musical adapter of FIG. 1.

FIG. 3 is a section taken through 3—3 of FIG. 2.

Figure 4:
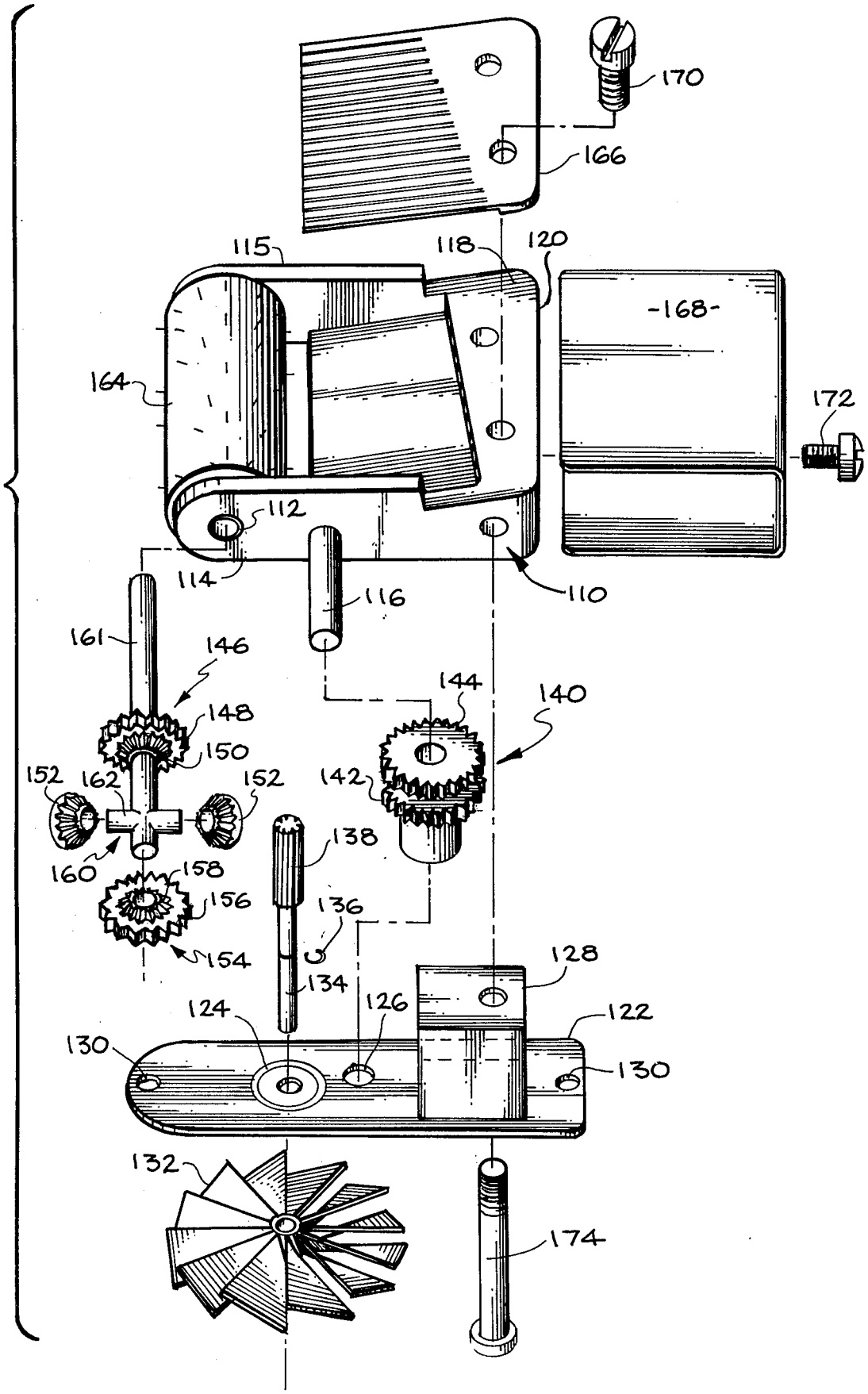
FIG. 4 is an exploded view of a music box mechanism to be powered by a fluid flow.

DESCRIPTION OF THE PREFERRED EMBODIMENTS AND BEST MODE FOR CARRYING OUT THE INVENTION

Turning now to FIG. 1, a teakettle, generally designated as 10, has a handle 12 and a pouring spout 14. Hook 16 may be operated from handle 12 to open cap 18. A musical adapter, generally designated as 20, is mounted on cap 18.

FIG. 2 shows the pipe nipple 24 (retained by nuts 22), passing through the whistle aperture 19 of cap 18. Steam from the teakettle 10 passes up pouring spout 14, through nipple 24 to chamber 31 of the adapter case 26. In passing through aperture 34, formed in bulkhead 32, the steam impinges the turbine wheel 36, causing the turbine wheel 36 and the worm gear 38 to rotate. Note that bulkhead 32 substantially shrouds the turbine wheel 36, and the flared aperture 34 cooperates with chamber 31, nipple 24, and spout 14 to provide the passage means to direct the steam to turbine wheel 36. The steam expands radially within chamber 35 formed between bulkheads 30 and 32 to be exhausted through vents 42.

A music box mechanism, generally designated as 28, is housed in closed chamber 27 of the adapter case 26. Worm gear 38 drives the plectrum cylinder 44 by way of the speed reduction gear train, generally designated as 40.

FIG. 3 illustrates the music box mechanism without a clock or coiled spring drive secured within chamber 27. A series of protruding studs 45 in plectrum cylinder 44 are located in programmed positions to pluck the tuned reeds of reed comb 46 in a typical manner to play a tune.

The exploded view of FIG. 4 shows a novel drive arrangement for a gas-driven music box. The assembly base, generally designated as 110, forms a yoke of two parallel extending arms 114 and 115, supporting two in-line journal bearings 112 (one hidden from view). Arm 114 also supports outwardly cantilevered idler stub shaft 116 on an axis parallel to journal bearings 112. A back gear, generally designated as 140, is mounted and is freely rotatable on stub shaft 116, the distal end of which is located in bore 126 formed in gear case side frame 122. Side frame 122 forms a third extending arm parallel to extending arms 114 and 115 and supports turbine journal bearing 124 with an axis parallel to that of stub shaft 116. Spacer blocks 128 and screw 174 secure side frame 122 with a spaced-apart relationship to assembly base 110.

A gear differential is assembled on a T-shaft, generally designated as 160. Side gears, generally designated as 146 and 154, are simultaneously used as inputs. Center gears 152, mounted on center shaft 162 on T-shaft 160, deliver the final drive through main shaft 161 which rotates on journal bearings 112, driving the plectrum cylinder 164 mounted thereon. Side gear 146 is retained by extending arm 114 and side gear 154 is retained by side frame 122. Center gears 152 are retained on center shaft 162 by snap rings (not shown).

Turbine shaft 134 is rotatably supported by journal bearing 124. The thrust of the shaft is borne by snap ring 136. The turbine wheel 132 is mounted on the distal end of the turbine shaft 134. Pinion gear 138, formed on turbine shaft 134, is in driving engagement with spur gear 156 of side gear 154. At a plane near the axis of differential center shaft 162, the pinion gear 138 is additionally in driving engagement with gear 142 of back gear 140. Gear 144 of back gear 140 is in engagement with spur gear 148 of side gear 146.

Reed comb 166 is mounted on reed plane 118 of base 110 by a pair of screws 170 (only one shown) and channel-shaped resonant member 168 is mounted to the back surface 120 of base 110 by a pair of screws 172 (one illustrated).

Gear case side frame 122 marginally extends beyond the profile of the rest of the mechanism to form a mounting flange. Holes 130 are formed within the extended margin to accommodate mounting screws (not shown).

Figure 5:
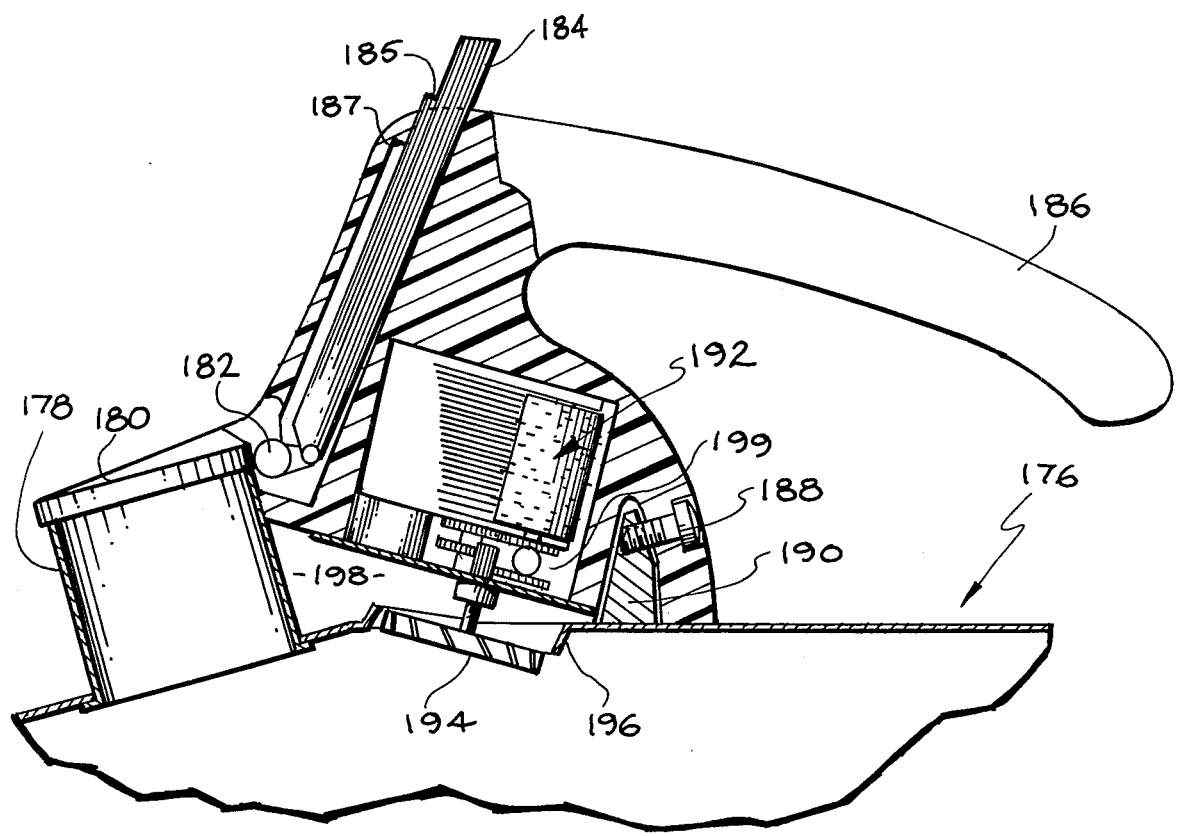
FIG. 5 illustrates a partially broken away sectional view of another embodiment of a steam operated music box built into the handle of a teakettle.

In FIG. 5, a teakettle, generally designated as 176, has a pouring spout 178, closed by a lid 180, mounted on a spring-loaded hinge 182. Lid 180 is opened by depressing button 184 and may be locked open by moving button 184 forward while being depressed, catching step 185 of button 184 under step 187 of handle 186.

Kettle 176 forms a flaired shrouding port 196, a passage means to direct a stream of steam axially to impinge turbine wheel 194 which drives the music box mechanism. The music box mechanism, generally designated as 192, is concealed within handle 186. Accelerated gasses or steam, having passed turbine wheel 194, are collected in chamber 198 wherein they are allowed to continuously expand as they flow through vents (not shown) on both sides of pouring spout 178. Nut 190, bonded to teakettle 176, and screw 188 anchor handle 186 to teakettle 176.

With reference to FIG. 4, a single driving input, represented by pinion 138, is split into two gear paths. The first path is direct from pinion 138 to spur gear 156 of side gear 154. The second path is from pinion 138 to gear 142 of back gear 140, through gear 144 of back gear 140 to spur gear 148 of side gear 146. Back gear 140 serves to reverse output direction of the second gear path and to alter its gear ratio.

For example, pinion 138 has ten teeth and spur fear 156 has thirty-five teeth. In the second gear path, the flow is from common pinion 138 with ten teeth to gear 142 of back gear 140 which has forty teeth. Gear 144 has forty-one teeth and drives side gear 148 which has thirty-six teeth, one tooth more than the opposing side gear 154.

At a turbine speed of 1000 revolutions per minute, clockwise, the side gear 154 is driven counterclockwise at 285.7 revolutions per minute. Side gear 146 is simultaneously driven clockwise at 284.7 revolutions per minute. The differential operates at a one to one ratio. Center gears 152 drive T-shaft 160 at one revolution per minute counterclockwise, yielding an effective speed reduction ratio of 1000 to one. The required ratio is from about 800 to one to about 1200 to one, depending primarily upon characteristics of the turbine wheel employed. Virtually any ratio in this range can be obtained by changing ratios of the gears shown.

Figure 6:
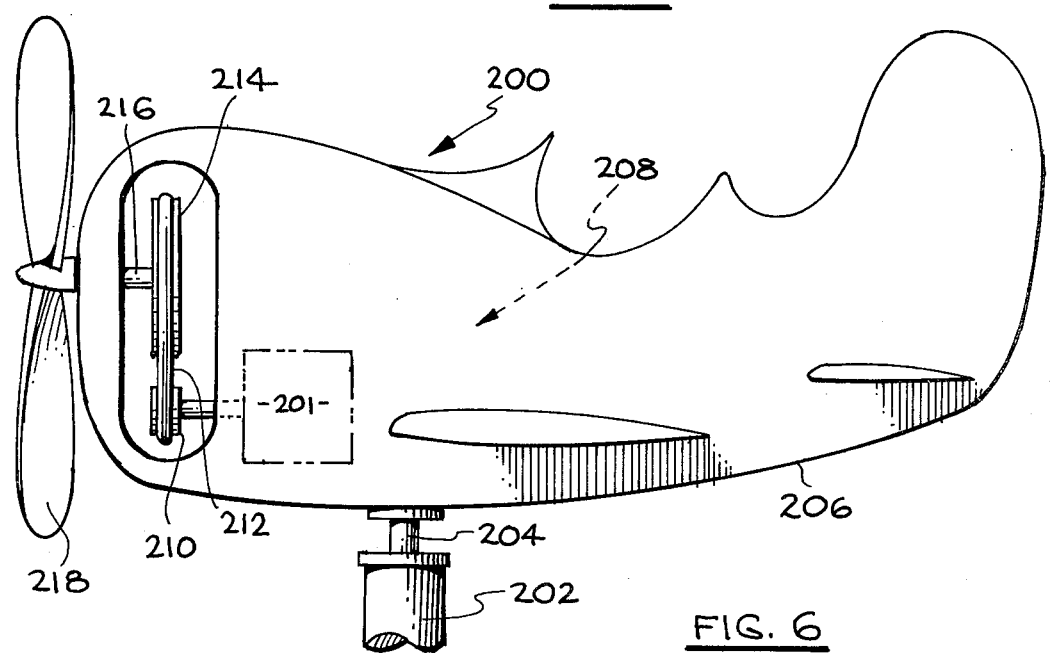
FIG. 6 illustrates a weather vane which uses the wind to drive a music box mechanism.

Yet another embodiment is illustrated in FIG. 6. A music box mechanism 201, as described in FIGS. 1 through 5 (shown in phantom), is housed within a weather vane, generally designated as 200. A resonant chamber 208 is formed by the body 206 of vane 200 aft of the music box 201. Body 206 is supported by pivot 204 anchored to post 202. In this embodiment, a large propeller or turbine wheel 218 drives relatively large pulley 214 via shaft 216. An O-ring 212, for example, is used as a belt and transfers power from pulley 214 to pulley 210. Propeller 218 spins at a lesser speed than does turbine wheel 132 of FIG. 4. The ratio of diameters between pulleys 214 and 210 compensates for the reduced speed of propeller 218 and O-ring belt 212 provides shock protection to the music box mechanism housed in vane chamber member 208.

It would, of course, be obvious to employ a multistage spur gear reduction train or a planocentric drive.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. A music box mechanism to be driven by a directed stream or pressurized fluid comprising:
   an assembly base for mounting said music box mechanism,
   a turbine wheel mounted on a turbine shaft rotatable mounted on said base,
   a gas reservoir to contain said pressurized fluid,
   passage means formed in said gas reservoir to direct said one or more streams of pressurized fluid to drivingly impinge said turbine wheel to cause said turbine wheel and said turbine shaft to rotate,
   a speed reduction gear train in driven engagement with said turbine shaft and mounted on said base,
   a musically programmed plectrum cylinder in driven engagement with said speed reduction gear train and rotatably mounted on said base, and
   an array of tuned reeds mounted on said base in cooperative relationship to said plectrum cylinder.

2. The invention as set forth in claim 1 wherein said speed reduction gear train has a speed reduction ratio sufficient to produce a movement of said plectrum cylinder surface past said array of reeds at a rate in the range of about four and one-half inches per minute to about nine and one-half inches per minute.

3. The invention as set forth in claim 1 wherein said one or more directed fluid streams impinge said turbine wheel axially and said turbine wheel is substantially of in-line type.

4. The invention as set forth in claim 1 wherein said turbine wheel is shrouded.

5. The invention as set forth in claim 1 wherein said pressurized fluid is steam and said gas reservoir is a teakettle.

6. A tune-playing musical teakettle comprising:
   a teakettle,
   a closable pouring spout,
   passage means formed in said teakettle to direct trapped steam from said kettle to drivingly impinge a turbine wheel rotatably mounted on a base in operating engagement with a speed-reducing gear train in operating engagement with a musically programmed plectrum cylinder rotatably mounted on said base,
   a set of musically tuned reeds mounted on said base in cooperative relationship with said plectrum cylinder,
   a resonant member mounted in conjunction with said base in a protective chamber formed within a kettle handle, and
   means formed within said handle to direct exhaust steam away from said handle.

7. A tune-playing musical teakettle comprising:
   a teakettle, and
   passage means formed by said teakettle to direct steam generated within said teakettle to impinge an in-line turbine wheel, to cause said turbine wheel to turn, said turbine wheel is in driving engagement with a music box mechanism attached to said teakettle, said music box produces a tune when steam is generated within said teakettle.

* * * * *